Oct. 13, 1942. D. C. AGAR 2,298,747
REFUSE COMPACTING APPARATUS
Filed Jan. 28, 1941 3 Sheets-Sheet 3
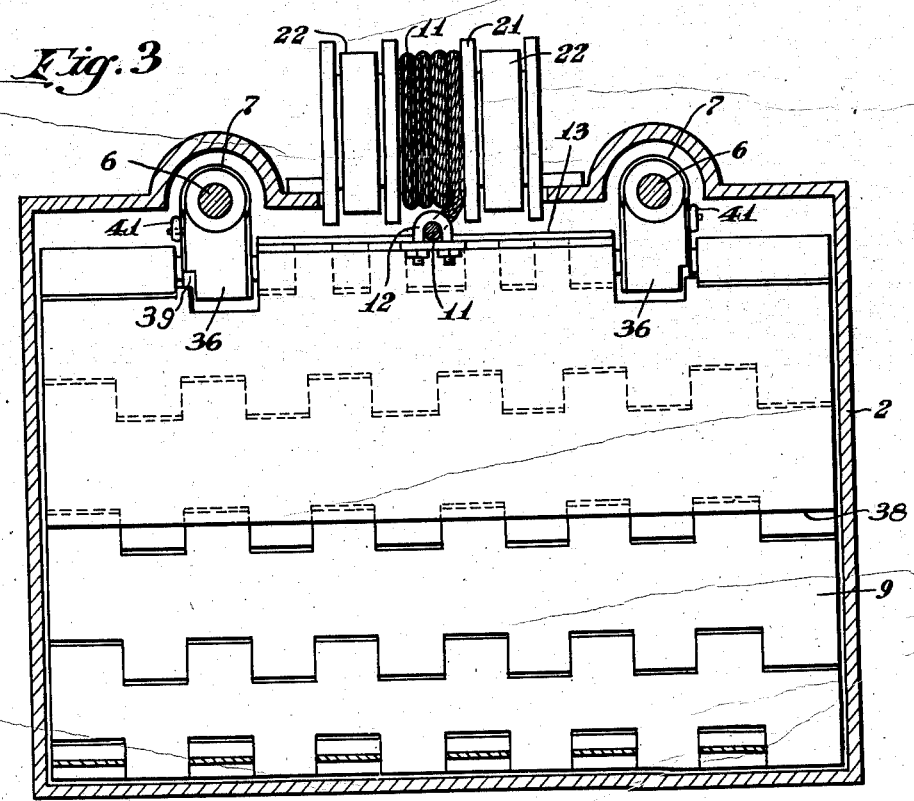
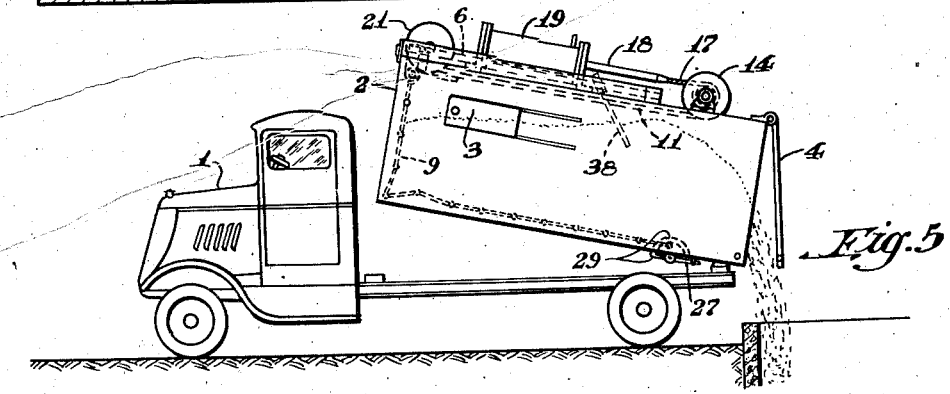
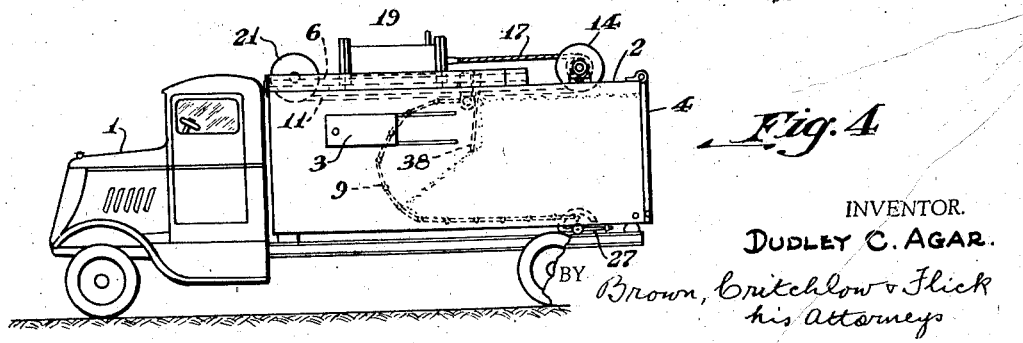
INVENTOR.
DUDLEY C. AGAR.
BY Brown, Critchlow & Flick
his Attorneys Patented Oct. 13, 1942

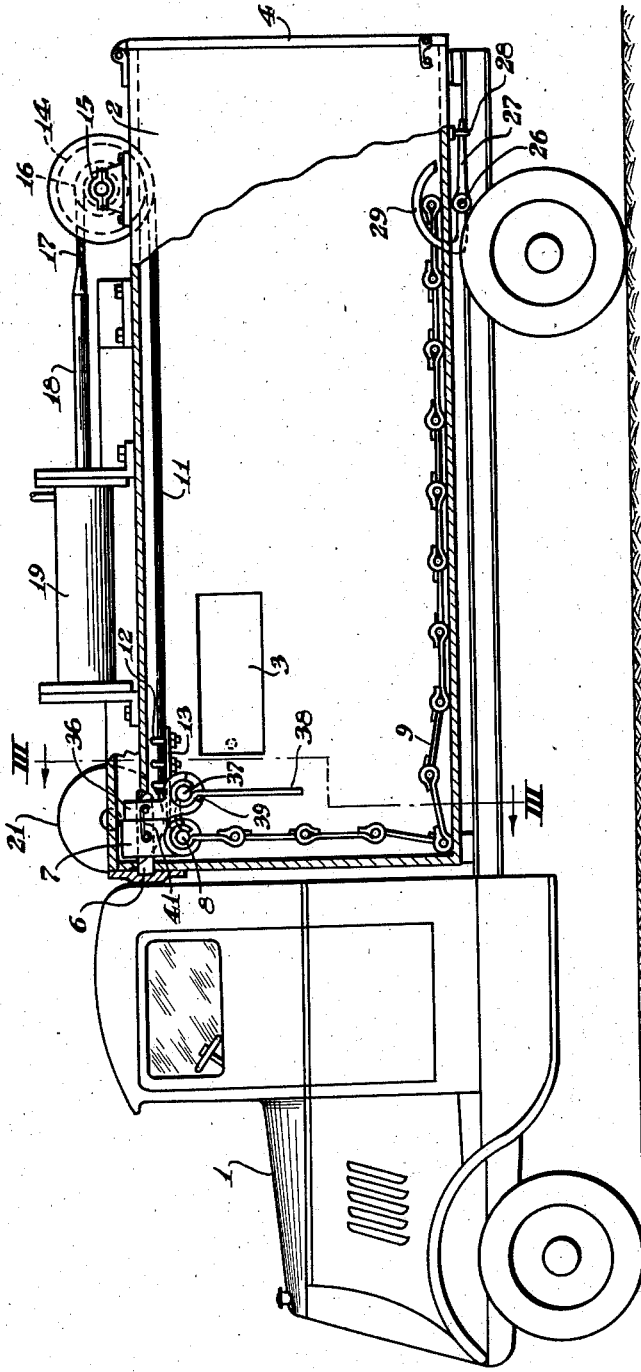

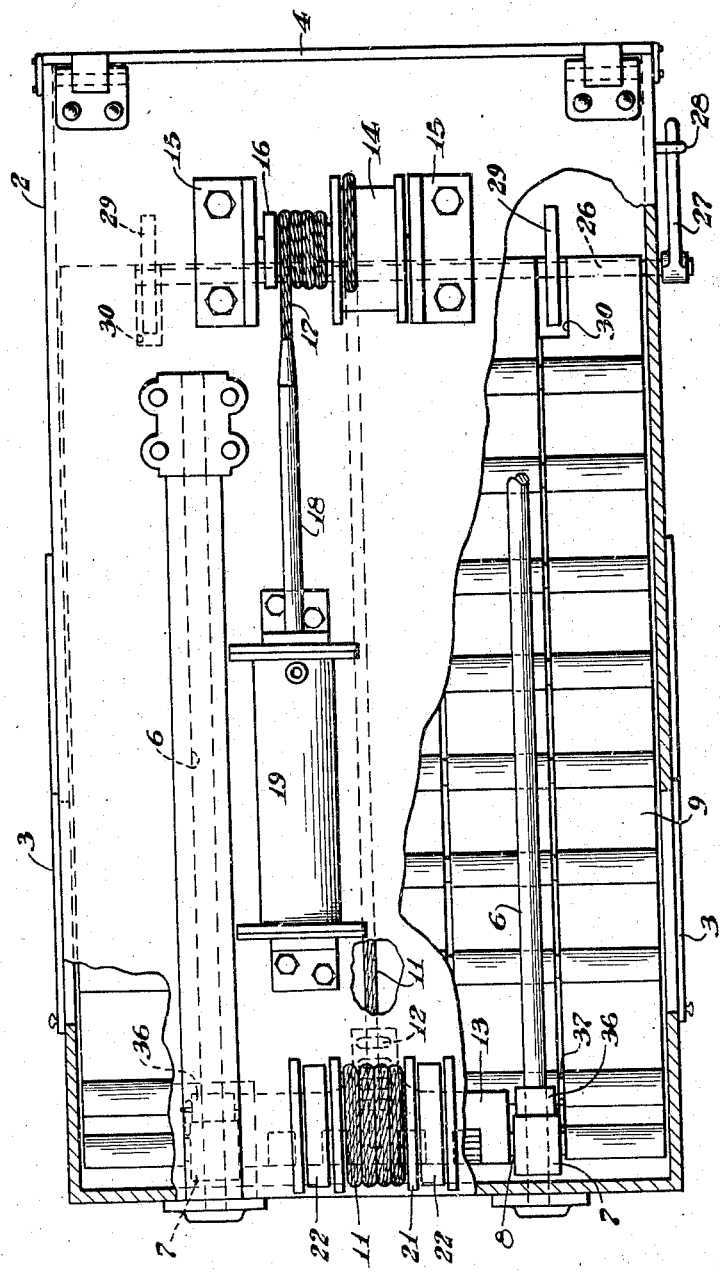

2,298,747

UNITED STATES PATENT OFFICE 2,298,747

REFUSE COMPACTING APPARATUS

Dudley C. Agar, Pittsburgh, Pa.

Application January 28, 1941, Serial No. 376,291

8 Claims. (Cl. 214—67)

This invention relates to refuse collecting vehicles such as garbage trucks, and more particularly to apparatus for stowing and compacting refuse in the bodies thereof.

It is among the objects of this invention to provide a refuse truck body with apparatus for stowing and compacting refuse therein which requires but little space in the body, which does not interfere with loading the body, which aids in unloading the body, which permits portions of the load to be restrained in compacted form, and which does not require a great deal of power to compact the refuse.

In accordance with this invention a refuse truck body is provided with a transverse partition having one of its ends normally disposed near one end of the body and having a flexible portion extending lengthwise of the body toward the opposite end thereof to a point at which that end of the partition is connected to the bottom of the body. In order to compact refuse within the truck body, means is provided for moving the first-mentioned end of the partition towards the opposite end of the body. Preferably, the partition is a flexible curtain-like member connected at one end to the front of the body near its top with the rear end of the partition detachably connected to the floor of the truck. When the upper end of the partition is moved toward the rear of the truck it pushes and rolls the refuse rearwardly. The truck body is also preferably provided directly behind the front portion of the partition with a plate that projects down into the body and which is moved rearwardly with the partition. This plate is so mounted that when the partition is returned to its original position the plate can remain and hold the refuse in compacted form.

The preferred embodiment of the invention is illustrated in the accompanying drawings in which Fig. 1 is a side view of a truck provided with a body, partly in section, made in accordance with my invention; Fig. 2 is an enlarged plan view of the body also partly in section; Fig. 3 is a vertical transverse section of the body taken on the line III—III of Fig. 1; Fig. 4 is a side view of the truck showing in dotted lines my invention in compacting position; and Fig. 5 is a side view showing the filled truck body being dumped.

Referring to Fig. 1 of the drawings, a truck 1 is provided with a refuse carrying closed body 2 having rearwardly sliding loading doors 3 in its sides near its front end. The rear end of the body is in the form of a door 4 hinged to the top of a body so that it can swing outwardly and permit the body to discharge its contents when the front end of the body is raised in any well known manner, such as by an hydraulic lift (not shown). Mounted in the top of the body are a pair of longitudinally extending spaced rods 6 on which a pair of bearings 7 are slidably mounted (Figs. 1, 2 and 3). These bearings project down into the truck and support a transverse horizontal shaft 8 on which is pivotally mounted the upper end of a flexible curtain-like partition 9 that extends substantially the full width of the body. This partition is preferably made from a plurality of relatively narrow metal plates that are hinged together along their longitudinal edges. Normally, bearings 7 are disposed at the front end of the rods so that the flexible partition hangs down in the body closely adjacent its front end. The partition is long enough to extend rearwardly along the floor of the body to a point near the rear end where it is connected to the body in a manner that will be described presently.

In operation refuse is thrown into the front portion of the body through the sliding doors until the pile that is thus formed interferes with the entrance of more refuse. The partition-supporting bearings 7 are then moved rearwardly on guide rods 6 whereby the flexible partition carries and rolls the refuse toward the rear end of the truck. In order to move the partition in this manner a cable 11 is connected by clamps 12 to a yoke 13 attached to shaft 8 and extends rearwardly within the body to a drum 14 journaled in bearings 15 mounted on top of the body. This drum is rotated by a small drum 16 coaxial therewith and rigidly connected thereto, and wound with a cable 17 connected to the rear end of a piston rod 18 projecting from the rear end of an hydraulic cylinder 19 also mounted on top of the truck body. The piston (not shown) is moved forward in the cylinder by hydraulic pressure which is produced in any suitable manner by the truck, such as by the same apparatus that furnishes the pressure for the hydraulic lift that dumps the truck body.

When the fluid pressure is released from behind the piston in cylinder 19 the upper end of the partition is returned to its original position by means of spring return apparatus. This apparatus is of well known form that does not require detailed explanation and, as shown in Figs. 2 and 3, comprises a drum 21 on which is wound the portion of cable 11 that extends forward from yoke 13. When this yoke and partition are moved rearwardly in the truck body the cable attached to the spring return drum rotates that drum which in turn winds up springs 22 connected to both ends of the drum. When the fluid pressure is released from cylinder 19 these springs cause return drum 21 to wind up the cable attached thereto and thus pull the front end of the partition back to the front of the truck.

For detachably connecting the rear end of the flexible partition to the truck body a transverse horizontal shaft 26 is disposed beneath the body to which it is rotatably connected, as shown in Figs. 1 and 2. One end of the shaft is provided with a handle 27 by which it can be turned and which is normally held in fixed position by any suitable retaining member 28 attached to the body. Extending forward from this shaft and then upwardly through slots in the floor of the body are a pair of laterally spaced latching arms 29. These arms also extend through slots 30 in the rear end of the flexible partition, and rearwardly and downwardly in an arc over the rear hinge pin of the partition (Fig. 1). When handle 27 is released and raised, shaft 26 swings latching arms 29 forward and down through the partition which is thereby released from the truck body floor.

The stowing and compacting apparatus described thus far will function satisfactorily to periodically move a pile of refuse rearwardly in the truck body from the vicinity of the loading doors 3, and to compact some of the load behind the loading doors. However, to keep a large mass of refuse tightly compacted it would ultimately be necessary to leave the flexible partition in compacting position. Further refuse can then be thrown into the truck body between the partition and the front of the body. When the body is dumped this additional refuse slides out under the partition the rear end of which is detached from the floor of the body for that purpose by swinging handle 27 upwardly.

It is preferred, however, that means be provided for holding refuse compacted in the rear of the truck body while the front portion of the flexible partition is moved forward to receive more refuse. Accordingly, another pair of bearings 36 are slidably mounted on guide rods 6 directly behind bearings 7 and support a horizontal transverse shaft 37 on which is pivotally mounted the upper end of a rigid plate 38 that extends down into the body. By notching the lower portions of bearings 36 at one end, stops 39 are formed that are engaged by projections of plate 38 whereby to limit forward swinging of the plate to a position substantially vertical when the body is horizontal. When yoke 13 is pulled rearwardly by cable 11, bearings 7 push bearings 36 along with them, whereby plate 38 pushes the refuse toward the back of the truck.

These two pairs of bearings are detachably connected together by any suitable detachable connecting means, such as hooks 41, so that while refuse is merely being pushed toward the back of the truck the plate 38 will be pulled forward again by the partition. However, when it is desired to restrain the refuse in a compact mass, the hooks are disconnected. Then, after the plate has been moved to a position similar to that shown in Fig. 4, and the partition starts to move back to its original position, the expanding pressure of the compacted refuse against the plate forces it against bearing stops 39 and thereby cants bearings 36 on guide rods 6 sufficiently to cause them to bind and remain stationary. Further refuse can then be compacted by the flexible partition between its forward portion and plate 38, and still more refuse stowed between the partition and the front end of the body. When the body is dumped, as shown in Fig. 5, plate 38 can swing backwardly as shown so that it will not interfere with the refuse on the other side of it.

It will be noted that one of the advantages of this stowing and compacting apparatus is that the refuse is forced rearwardly against the unloading door 4 of the body. Therefore, when this door is opened the refuse literally springs out. In other words, the compacting apparatus facilitates unloading of the truck. It can also be used to actively aid unloading by being operated during unloading so as to positively push refuse rearwardly and out through the unloading door.

According to the provisions of the patent statutes, I have explained the principle and construction of my invention, and have illustrated and described what I now consider to represent its best embodiment. However, I desire to have it understood that, within the scope of the appended claims, the invention may be practiced otherwise than as specifically illustrated and described.

I claim:

1. In a refuse truck body, a transverse partition having one of its ends normally disposed near one end of said body and having a flexible portion extending lengthwise of said body toward the opposite end thereof, a clamp for detachably connecting the other of said ends of the partition to the bottom of said body, manually operable means for swinging said clamp out of engagement with the partition, fluid pressure operated means for moving said one end of the partition towards said opposite end of the body to thereby compact refuse between the partition and said opposite end, and spring actuated means for returning said partition to its original position.

2. In a refuse truck body, a transverse partition having one of its ends normally disposed near one end of said body and having a flexible portion extending lengthwise of said body toward the opposite end thereof to a point at which the other of said ends of the partition is connected to the bottom of said body, means for moving said one end of the partition towards said opposite end of the body to thereby compact refuse between the partition and said opposite end, and means movable bodily along with the partition towards said opposite end of the body for holding the refuse compacted when said one end of the partition is moved away from said opposite end of the body.

3. In a refuse truck body, a transverse partition having one of its ends normally disposed near one end of said body and having a flexible portion extending lengthwise of said body toward the opposite end thereof to a point at which the other of said ends of the partition is connected to the bottom of said body, means for moving said one end of the partition towards said opposite end of the body to thereby compact refuse between the partition and said opposite end, and a substantially vertical refuse-engaging member disposed transversely of said body between the ends of the partition and movable with said one end of the partition, said member being formed to remain in the position to which it is thus moved just before said one end of the partition is moved away from said opposite end of the body.

4. In a refuse truck body having an unloading door in its rear end, a transverse partition having one end normally disposed near the front end of said body and having a flexible portion extending toward the rear of said body to a point at which the rear end of the partition is connected to the bottom of said body, means for moving the front end of the partition rearwardly to thereby compact refuse between the partition and said unloading door, a substantially vertical refuse-restraining plate disposed transversely of said body between the ends of the partition and movable with the partition towards the rear end of the body, and means connecting said plate to the body for normally holding it in the rearward position to which it is moved with the partition just before the front end of the partition is moved back toward the front of the body, said plate being adapted to swing rearwardly when said unloading door is opened whereby to remove obstruction to unloading of refuse between said plate and the front of said body.

5. In a refuse truck body, a movable transverse partition, means for moving the partition towards one end of said body to compact refuse between them, means disposed between said partition and end of the body for holding the refuse compacted when the partition is returned to its original position, and means for detachably connecting said refuse-holding means to said partition whereby they are movable together lengthwise of said body.

6. In a refuse truck body having an unloading door in its rear end, a supporting and guiding rod extending lengthwise of said body along its top, a flexible transverse partition having its front end slidably mounted on said rod, a portion of the partition extending along the floor of said body toward its rear end, means for connecting the rear end of the partition to said floor, and means connected to the front end of the partition for moving it rearwardly along said rod to pack refuse against said door and for returning the front end of the partition to its forward position.

7. In a refuse truck body having an unloading door in its rear end, a rod extending lengthwise of said body along its top, a flexible transverse partition having its front end slidably mounted on said rod, a portion of the partition extending along the floor of said body toward its rear end, means for connecting the rear end of the partition to said floor, means connected to the front end of the partition for moving it rearwardly along said rod and for returning it to its forward position, and a rigid refuse-restraining member slidably mounted on said rod behind the front end of the partition, said member extending transversely of said body and projecting down into it for engaging the front side of a pile of refuse compacted between it and the rear end of said body, and said member being formed to bind on said rod when canted thereon by the pressure of said refuse against the rear surface of said member.

8. In a refuse truck body having an unloading door in its rear end, a rod extending lengthwise of said body along its top, a flexible transverse partition having its front end slidably mounted on said rod, a portion of the partition extending along the floor of said body toward its rear end, means for connecting the rear end of the partition to said floor, means connected to the front end of the partition for moving it rearwardly along said rod and for returning it to its forward position, a transverse shaft slidable along said rod between the front end of the partition and the rear end of the rod, a rigid transverse plate pivotally mounted at its upper end on said shaft and adapted to engage the front side of a pile of refuse disposed between it and the rear end of said body, and means for restricting forward pivoting of said plate to a position wherein the plate is substantially vertical.

DUDLEY C. AGAR.